United States Patent [19]

Goto et al.

[11] Patent Number: 5,167,858
[45] Date of Patent: Dec. 1, 1992

[54] PYRIMIDINE DERIVATIVE AND LIQUID CRYSTAL COMPOSITION CONTAIN THE SAME

[75] Inventors: Yasuyuki Goto; Makoto Ushioda, both of Chiba, Japan

[73] Assignee: Chisso Corporation, Ohsaka, Japan

[21] Appl. No.: 648,009

[22] Filed: Jan. 31, 1991

[30] Foreign Application Priority Data

Mar. 15, 1990 [JP] Japan .................................. 2-64767

[51] Int. Cl.⁵ .................... C09K 19/34; C07D 239/55
[52] U.S. Cl. .............. 252/299.61; 252/299.5; 544/242
[58] Field of Search ................. 544/242; 252/299.61, 252/299.5

[56] References Cited

U.S. PATENT DOCUMENTS

| | | | |
|---|---|---|---|
| 4,640,795 | 2/1987 | Ogawa et al. | 252/299.5 |
| 4,752,414 | 6/1988 | Eidenschink et al. | 544/242 |
| 4,797,228 | 1/1989 | Goto et al. | 252/299.63 |
| 5,032,313 | 7/1991 | Goto et al. | 252/299.63 |

Primary Examiner—Mukund J. Shah
Assistant Examiner—Y. N. Gupta
Attorney, Agent, or Firm—Wenderoth, Lind & Ponack

[57] ABSTRACT

The present invention provides a novel pyrimidine derivative having a large $\Delta\epsilon$ value and a low viscosity, and affording a liquid crystal composition having a high clearing point and a low threshold voltage value without raising its viscosity when the derivative is mixed with other liquid crystal compositions or liquid crystal compound. The pyrimidine derivative is a 5-[2'-(trans-4''-alkylcyclohexyl)ethyl]-2-(3,4-difluorophenyl)-pyrimidine expressed by the formula

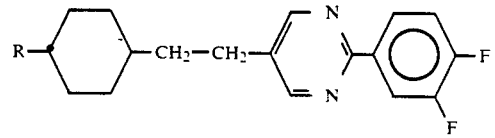

wherein R represents a linear alkyl group having 1 to 10 carbon atoms.

4 Claims, No Drawings

PYRIMIDINE DERIVATIVE AND LIQUID CRYSTAL COMPOSITION CONTAIN THE SAME

BACKGROUND OF THE INVENTION

1. Field of the Invention

This invention relates to a pyrimidine derivative as a novel liquid crystal compound used as an electrooptical display material. More particularly it relates to a compound which is suitable as a component of a liquid crystal composition useful for low voltage drive, and a liquid crystal composition containing the liquid crystal compound and having superior characteristics.

2. Description of the Related Art

Various characteristics are required for liquid crystal materials used for liquid crystal display devices, depending upon display modes, use applications, etc., and when twisted nematic liquid crystal materials which have now been most broadly utilized are taken as an example, the following characteristics are required:

1. colorless, stable to heat and light, and stable electrically and chemically;
2. broad service temperature range;
3. high electrooptical response rate;
4. low drive voltage;
5. steep rise of the voltage-light transmittance characteristic and small temperature dependency; and
6. broad range of view angle.

Among these various characteristics, the low drive voltage and the broad service temperature range are particularly important. In the case of the twisted, nematic liquid crystal materials, there is the following relationship between the threshold voltage value Vth and the dielectric anisotropy value $\Delta\epsilon$:

$$V\text{th} = K\sqrt{\frac{K_{11} + \frac{1}{4}(K_{33} - 2K_{22})}{\Delta\epsilon}}$$

wherein $K_{11}$, $K_{22}$ and $K_{33}$ represent the elastic constants relative to splay, twist and bend, respectively, and K represents a constant of proportionality. Thus, in order to lower the threshold voltage, it is necessary that the $\Delta\epsilon$ value be positive and large.

As for liquid crystal compounds having a large $\Delta\epsilon$ value heretofore used, 4-alkylbenzoic acid-4-cyanophenyl esters, 4-alkyl-4'-cyanobiphenyls, etc. are exemplified. These compounds have a low N-I point, so the nematic mesomorphic range of compositions using these compounds is narrowed. Further, 4-alkyl-4"-cyanoterphenyls, 4-(trans-4'-alkylcyclohexyl)-4"-cyanobiphenyls, etc. have a high N-I point, but their elastic constant is so large that the threshold voltage is elevated. Further, as a pyrimizine derivative, a compound expressed by the formula

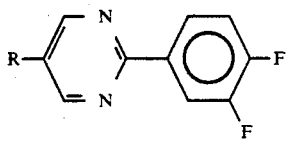

is disclosed in U.S. Pat. No. 4,640,795. This compound has a relatively large $\Delta\epsilon$ value, but it exhibits no liquid crystal phase; hence it has a drawback of lowering the clearing point of liquid crystal compositions using this compound. Furthermore, U.S. Pat. No. 4,752,414 discloses a compound expressed by the formula

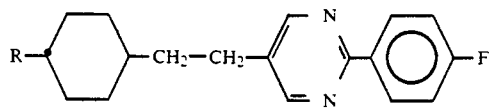

but the compound has a $\Delta\epsilon$ value as small as about +7, and its compatibility with other liquid crystal compounds at low temperatures is inferior; hence it is not useful as a component of liquid crystal compositions for low voltage drive.

SUMMARY OF THE INVENTION

The object of the present invention is to provide a novel liquid crystal compound capable of affording a liquid crystal composition having a high upper limit of a nematic mesomorphic range and yet having a low threshold voltage when the compound is mixed with one or more kinds of nematic liquid crystal compounds.

This object is achieved by the pyrimidine derivative of the present invention, which is a 5-[2'-(trans-4"-alkylcyclohexyl)ethyl]-2-(3,4-difluorophenyl)pyrimidine expressed by the formula

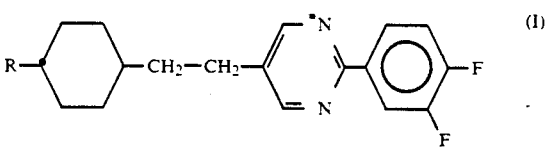

wherein R represents a linear alkyl group having 1 to 10 carbon atoms.

The liquid crystal composition of the present invention is characterized by containing 5-[2'-(trans-4"-alkylcyclohexyl)ethyl]-2-(3,4-difluorophenyl) pyrimidines expressed by the formula (I) therein in an amount of 2 to 40% by weight based upon the weight of the composition.

DETAILED DESCRIPTION OF PREFERRED EMBODIMENTS

The pyrimidine derivative (I) of the present invention can be prepared according to the following process:

First step

A 2-(trans-4-alkylcyclohexyl)-1-bromoethane (2) is reacted with diethyl malonate in ethanol in the presence of sodium ethoxide to obtain a diethyl 2-(trans-4-alkylcyclohexyl)ethylmalonate (3).

Second step 3,4-difluorobenzonitrile (4) is reacted with dried HCl gas in anhydrous methanol, followed by reacting the resulting crystals with dried ammonia gas in anhydrous ethanol to obtain 3,4-difluorobenzamidine hydrochloride (5).

Third step

The diethyl 2-(trans-4-alkylcyclohexyl)ethylmalonate (3) is reacted with the 3,4-difluorobenzamidine hydrochloride (5) in anhydrous ethanol in the presence of sodium ethoxide to obtain a 4,6-dihydroxy-5-[2'-(trans-4"-alkylcyclohexyl)ethyl]-2-(3,4-difluorophenyl)-pyrimidine (6).

Fourth step

The above compound (6) is reacted with phosphorus oxychloride in the presence of N,N-diethylaniline to obtain a 4,6-dichloro-5-[2'-(trans-4''-alkylcyclohexyl)ethyl]-2-(3,4-difluorophenyl)pyrimidine (7).

Fifth step

The above compound (7) is reacted with hydrogen gas in ethyl alcohol, using a catalyst of palladium/carbon and in the presence of a suitable organic base to obtain the pyrimidine derivative (I) of the present invention.

compounds, benzylideneaniline compounds, biphenyl compounds, terphenyl compounds, phenyl or cyclohexylcyclohexanecarboxylate compounds, phenylcyclohexane compounds, cyclohexylbiphenyl compounds, cyclohexylcyclohexanecompounds, cyclohexylnaphthalene compounds, 1,4-biscyclohexylbenzene compounds, 4,4'-biscyclohexylbiphenyl compounds, phenylpyrimidine compounds, phenylpyridazine compounds or cyclohexylpyridazine compounds and N-oxide compounds thereof, phenyldioxane compounds, phenyl-1,3-dithian compounds or cyclohexyl-1,3-dithian compounds, 1,2-diphenylethane compounds, 1-phenyl-2-cyclohexylethane compounds, 1,2-dicy-

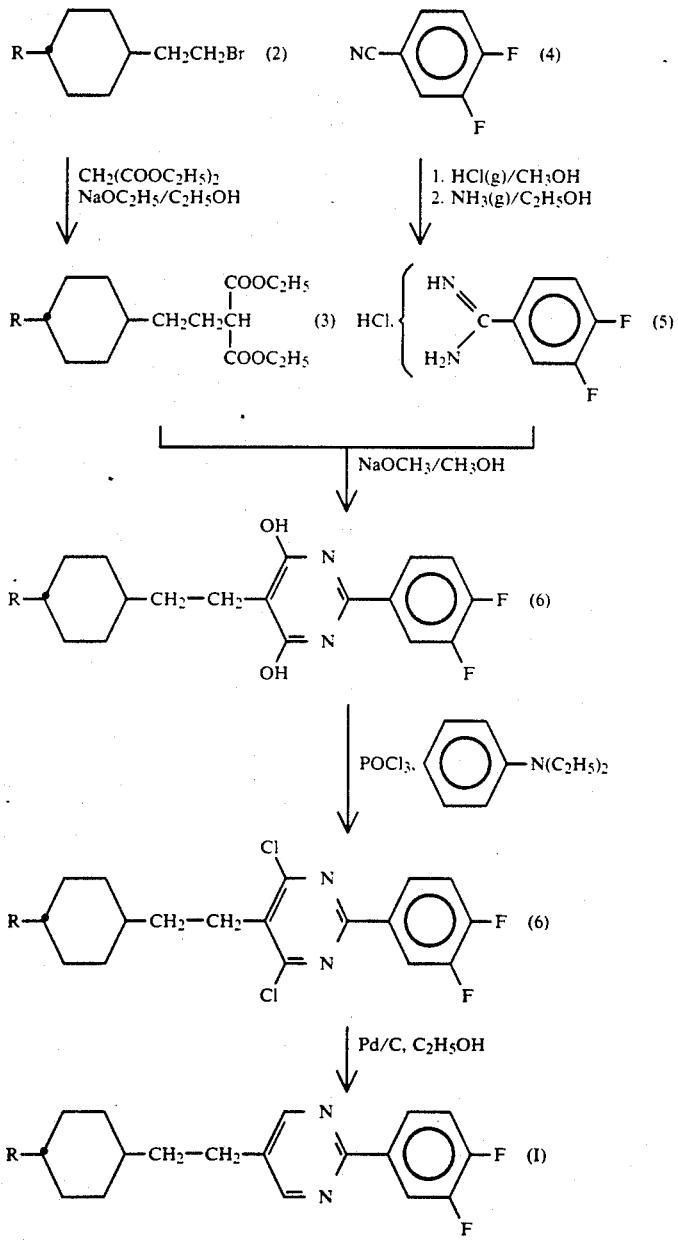

The composition of the present invention contains at least one of the pyrimidine derivatives expressed by the formula (I) in an amount of 2 to 40% by weight based upon the weight of the composition. Other components of the composition are preferred to be chosen from known substances belonging to groups of azoxybenzene clohexylethane compounds, and in cases, halogenated stilbene compounds, benzyl phenyl ether compounds, tolan compounds, substituted cinnamic acid compounds, etc.

The present invention will be described in more detail by way of Examples and Use examples, but it should not be construed to be limited thereto.

EXAMPLE 1

Preparation of 5-[2'-(trans-4''-propylcyclohexyl)ethyl]-2-(3,4-difluorophenyl)pyrimidine Metal sodium (0.3 g) was dissolved in anhydrous methanol (100 ml), followed by adding diethyl 2-(trans-4'-propylcyclohexyl)ethylmalonate (3.2 g) and 3,4-difluorobenzamidine hydrochloride (1.9 g) with stirring, reacting the mixture under reflux for 10 hours, thereafter cooling the reaction solution, pouring it in 6N HCl (100 ml) and ice (300 g), filtering off deposited yellow crystals, washing with water and drying crystals to obtain 4,6-dihydroxy-5-[2'-(trans-4''-propylcyclohexyl)ethyl]-2-(3,4-difluorophenyl)pyrimidine (3.5 g).

The thus obtained dihydroxypyrimidine derivative (3.5 g) was dissolved in phosphorus oxychloride (30 ml) and N,N-diethylaniline (2 ml), followed by reacting the solution under reflux for 20 hours, distilling off excess phosphorus oxychloride, extracting the resulting product with toluene (50 ml), washing the extraction solution with 2N-NaOH aqueous solution, water, dilute hydrochloric acid, and water in this order, drying the resultant toluene solution over anhydrous magnesium sulfate, distilling off toluene and recrystallizing the residue from ethyl acetate to obtain 4,6-dichloro-5-[2'-(trans-4''-propylcyclohexyl)ethyl]-2-(3,4-difluorophenyl)pyrimidine (2.5 g). The melting point of the compound was 91.4 °C.

This dichloropyrimidine compound (2.5 g) was then dissolved in ethyl alcohol (50 ml), followed by subjecting the solution to hydrogenation using 5% Pd/C (0.1 g) in the presence of triethylamine (1 ml), filtering off Pd/C catalyst after the absorption of hydrogen gas ceased, distilling off ethyl alcohol from the filtrate and recrystallizing a residue from ethyl acetate to obtain 5-[2'-(trans-4''-propylcyclohexyl)ethyl]-2-(3,4-difluorophenyl)pyrimidine (1.4 g).

This compound exhibited liquid crystal phases.

C-N point (crystal-nematic phase transition point): 4.7° C. N-I point (nematic phase-isotropic liquid phase transition point): 99.1° C. Its structure was confirmed by NMR and MS analyses.

The following compounds were obtained in the same manner as above:

5-[2'-(trans-4''-methylcyclohexyl)ethyl]-2-(3,4-difluorophenyl)pyrimidine

5-[2'-(trans-4''-ethylcyclohexyl)ethyl]-2-(3,4-difluorophenyl)pyrimidine

5-[2'-(trans-4''-butylcyclohexyl)ethyl]-2-(3,4-difluorophenyl)pyrimidine

5-[2'-(trans-4''-pentylcyclohexyl)ethyl]-2-(3,4-difluorophenyl)pyrimidine
(C-N point:74.7° C., N-I point:106.2° C.)

5-[2'-(trans-4''-hexylcyclohexyl)ethyl]-2-(3,4-difluorophenyl)pyrimidine

5-[2'-(trans-4''-heptylcyclohexyl)ethyl]-2-(3,4-difluorophenyl)pyrimidine

5-[2'-(trans-4''-octylcyclohexyl)ethyl]-2-(3,4-difluorophenyl)pyrimidine

5-[2'-(trans-4''-nonylcyclohexyl)ethyl]-2-(3,4-difluorophenyl)pyrimidine

5-[2'-(trans-4''-decylcyclohexyl)ethyl]-2-(3,4-difluorophenyl)pyrimidine

USE EXAMPLE 1

A liquid crystal composition A consisting of

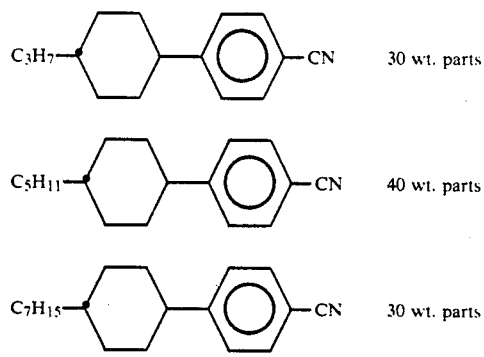

| | |
|---|---|
| $C_3H_7$– structure –CN | 30 wt. parts |
| $C_5H_{11}$– structure –CN | 40 wt. parts |
| $C_7H_{15}$– structure –CN | 30 wt. parts | exhibited a N-I point of 52.3° C. and a viscosity at 20° C. of 21.7 cps. This liquid crystal composition was sealed in a TN cell of 9 μm thickness threshold voltage was examined to give 1.78 V. When the compound shown in Example 1 of the present invention (15 parts by weight) was added to the liquid crystal composition A (85 parts by weight), the resulting liquid crystal composition exhibited a N-I point raised up to 57.0° C. and a viscosity at 20° C. somewhat raised up to 22.7 cps. When this liquid crystal composition was sealed in the same TN cell as above and its threshold voltage was examined, the voltage lowered down to 1.62 V.

COMPARATIVE USE EXAMPLE 1

A liquid crystal composition consisting of the liquid crystal composition A in Use example 1 (85 parts by weight) and a compound expressed by the formula

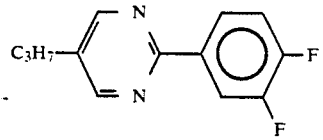

(15 parts by weight) was prepared. This liquid crystal composition had a N-I point lowered down to 34.6° C. and a viscosity at 20° C. of 22.2 cps.

The pyrimidine derivative of the present invention is a novel liquid crystal compound having a large Δε value and a low viscosity. When the pyrimidine derivative is mixed with other liquid crystal composition(s) or liquid crystal compound(s), it is possible to obtain a liquid crystal composition having a high clearing point and a low threshold voltage, without raising its viscosity.

What we claim is:

1. A pyrimidine derivative, 5-[2'-(trans-4''-alkylcyclohexyl)ethyl]-2-(3,4-difluorophenyl)pyrimidine compound, expressed by the formula (I)

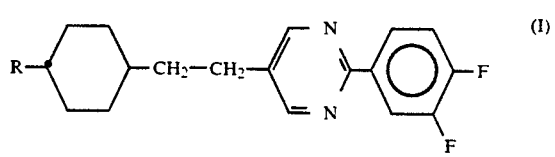

(I)

wherein R represents a linear alkyl group having 1 to 10 carbon atoms.

2. A compound according to claim 1, namely 5-[2'-(trans-4''-propylcyclohexyl)ethyl]-2-(3,4-difluorophenyl)pyrimidine.

3. A compound according to claim 1, namely 5-[2'-(trans-4''-pentylcyclohexyl)ethyl]-2-(3,4-difluorophenyl)pyrimidine.

4. A liquid crystal composition comprising at least two components at least one of which is a compound as set forth in claim 1, the content of which is 2 to 40% by weight based upon the weight of said liquid crystal composition.

* * * * *